(12) United States Patent
Muratomi

(10) Patent No.: US 6,542,804 B2
(45) Date of Patent: Apr. 1, 2003

(54) AUTOMATIC TRANSMISSION CONTROLLER HAVING AUTOMATIC-SHIFTING-TO-NEUTRAL CONTROL

(75) Inventor: Yoshinori Muratomi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 48 days.

(21) Appl. No.: 09/731,707

(22) Filed: Dec. 8, 2000

(65) Prior Publication Data

US 2001/0049575 A1 Dec. 6, 2001

(30) Foreign Application Priority Data

Jun. 6, 2000 (JP) ......................................... 2000-169251

(51) Int. Cl.$^7$ ............................................... G06F 17/00
(52) U.S. Cl. ........................... 701/62; 701/51; 701/64; 477/99; 477/116; 477/125
(58) Field of Search ............................. 701/51, 52, 62, 701/53, 64; 477/114, 120, 122, 116, 125, 96, 97, 124, 99, 110, 127; 74/665 T, 336 R; 180/247; 73/112, 118.1, 129; 192/222, 3.31, 3.26, 3.61

(56) References Cited

U.S. PATENT DOCUMENTS

| | | | | |
|---|---|---|---|---|
| 4,300,652 A | * | 11/1981 | Redzinski et al. | 180/271 |
| 4,363,249 A | * | 12/1982 | Stugart | 180/272 |
| 4,414,937 A | * | 11/1983 | Ueda et al. | 123/179.1 |
| 4,825,993 A | * | 5/1989 | Kurihara et al. | 477/79 |
| 4,871,994 A | * | 10/1989 | Takeda et al. | 200/61.88 |
| 5,005,687 A | * | 4/1991 | Kurihara et al. | 192/92 |
| 5,052,245 A | * | 10/1991 | Kigoshi | 180/247 |
| 5,052,531 A | * | 10/1991 | Bota | 192/219.1 |
| 5,053,959 A | * | 10/1991 | Genise | 701/52 |
| 5,117,710 A | * | 6/1992 | Asano et al. | 74/336 R |
| 5,522,779 A | * | 6/1996 | Tabata et al. | 477/126 |
| 5,653,659 A | * | 8/1997 | Kunibe et al. | 477/110 |
| 6,270,443 B1 | * | 8/2001 | Ito et al. | 477/114 |
| 6,275,759 B1 | * | 8/2001 | Nakajima et al. | 123/179.4 |
| 6,314,801 B1 | * | 11/2001 | Reggiardo | 73/112 |

FOREIGN PATENT DOCUMENTS

| | | | | |
|---|---|---|---|---|
| JP | 59-62754 | | 4/1984 | |
| JP | 04370453 A | * | 12/1992 | F16H/61/00 |
| JP | 09079374 A | * | 3/1997 | F16H/61/18 |
| JP | 11059268 A | * | 3/1999 | B60Q/5/00 |
| JP | 11193866 A | * | 7/1999 | F16H/61/20 |
| JP | 11230329 A | * | 8/1999 | F16H/61/16 |

* cited by examiner

Primary Examiner—Jacques H. Louis-Jacques
(74) Attorney, Agent, or Firm—Sughrue Mion, PLLC

(57) ABSTRACT

An automatic transmission controller having automatic-shifting-to-neutral control is provided, wherein automatic-shifting-to-neutral control is notified to a driver so as not give him a sense of incongruity and it is prohibited on a slope so as to prevent backward moving of a vehicle. In an automatic transmission controller having automatic-shifting-to-neutral control for shifting the automatic transmission to neutral when a vehicle is continuously stopped in an idling state for a predetermined time, the automatic transmission controller comprises automatic-shifting-to-neutral notifying/warning means for notifying the automatic-shifting-to-neutral state, slope detecting means for detecting that the vehicle is on a slope, and automatic-shifting-to-neutral control prohibiting means for prohibiting the automatic-shifting-to-neutral control when it is detected that the vehicle is on the slope.

16 Claims, 5 Drawing Sheets

AUTOMATIC TRANSMISSION CONTROLLER HAVING AUTOMATIC-SHIFTING-TO-NEUTRAL CONTROL

BACKGROUND OF THE INVENTION

1. Field of the Invention

The present invention relates to automatic transmission controllers equipped in vehicles and the like, and in particular relates to an automatic transmission controller having automatic-shifting-to-neutral control wherein when a vehicle is stopping for a predetermined time at the forward drive range in an idling state, the automatic transmission is shifted to neutral.

2. Description of the Related Art

In a conventional automatic transmission controller having automatic-shifting-to-neutral control as disclosed in Japanese Unexamined Patent Application Publication No. 59-62754, for example, the state that a vehicle is stopped by depressing the brake pedal (the vehicle speed: 0 km) while the gas pedal is not depressed and the automatic transmission is at "D" range (the forward drive range) is continuously detected for a predetermined time, fuel consumption reducing control is performed by releasing engagement of one of frictional engaging elements for actuating a clutch and a brake in the automatic transmission so as to shift the automatic transmission to neutral, thereby reducing the load to the engine.

In the automatic control for shifting to neutral as above, when the automatic shifting control is canceled by releasing the brake pedal when a driver will start the vehicle after the automatic shifting control, there is slight time lag until the frictional engaging element is brought into engagement again. Since such a conventional device has not means for informing a driver that the automatic shifting control is working, there has been a problem that a driver has a sense of incongruity about the operation just after the cancellation of the automatic shifting control.

In particular, while the automatic shifting control is performed during stopping on a slope (upward slope) by depressing the brake pedal, when a driver releases the brake pedal to start, there is a possibility of backward moving of the vehicle because of the time lag.

SUMMARY OF THE INVENTION

In order to solve the above-mentioned problems, it is an object of the present invention to provide an automatic transmission controller having automatic-shifting-to-neutral control, wherein it is informed to a driver that the automatic shifting control is working so as not to give the driver a sense of incongruity and the automatic shifting control is prohibited on a slope so as to prevent a vehicle from moving backward.

In view of the above-mentioned object, in accordance with a first aspect of the present invention, in an automatic transmission controller having automatic-shifting-to-neutral-control for shifting the automatic transmission to neutral when a vehicle is continuously stopped in an idling state for a predetermined time, the automatic transmission controller comprises automatic-shifting-to-neutral notifying/warning means for notifying that the state has automatically shifted to neutral.

Preferably, an exclusive lamp of the automatic-shifting-to-neutral notifying/warning means is operated by either lighting or flashing.

In the automatic-shifting-to-neutral notifying/warning means, a lamp for the N range of a range select display may be operated by one of switching on and flashing along with a lamp for the present range.

Preferably, the automatic-shifting-to-neutral notifying/warning means notifies/warns a shifting-to-neutral state during control sections which are an entering control section of automatic-shifting-to-neutral, a stationary control section thereof, and a canceling control section thereof.

Preferably, the automatic-shifting-to-neutral notifying/warning means notifies/warns a shifting-to-neutral state during a stationary control section of automatic-shifting-to-neutral and a canceling control section thereof.

Preferably, the automatic-shifting-to-neutral notifying/warning means notifies/warns the shifting state to neutral for a predetermined time after the completion of the canceling control section.

An automatic transmission controller may further comprise: slope detecting means for detecting that the vehicle is on a slope; and automatic-shifting-to-neutral control prohibiting means for prohibiting the automatic-shifting-to-neutral control when it is detected that the vehicle is on a slope.

In accordance with a second aspect of the present invention, in an automatic transmission controller having automatic-shifting-to-neutral control for shifting the automatic transmission to neutral when a vehicle is continuously stopped in an idling state for a predetermined time, the automatic transmission controller comprises: slope detecting means for detecting that the vehicle is on a slope; and automatic-shifting-to-neutral control prohibiting means for prohibiting the automatic-shifting-to-neutral control when it is detected that the vehicle is on a slope.

The slope detecting means may comprise an inclination angle sensor for detecting the slope from the output of the sensor.

The slope detecting means may comprise a suspension stroke sensor for detecting the slope from the output of the sensor.

The slope detecting means may comprise a navigation system for detecting the slope from the output of the system.

DESCRIPTION OF THE PREFERRED EMBODIMENTS

Figure 1:
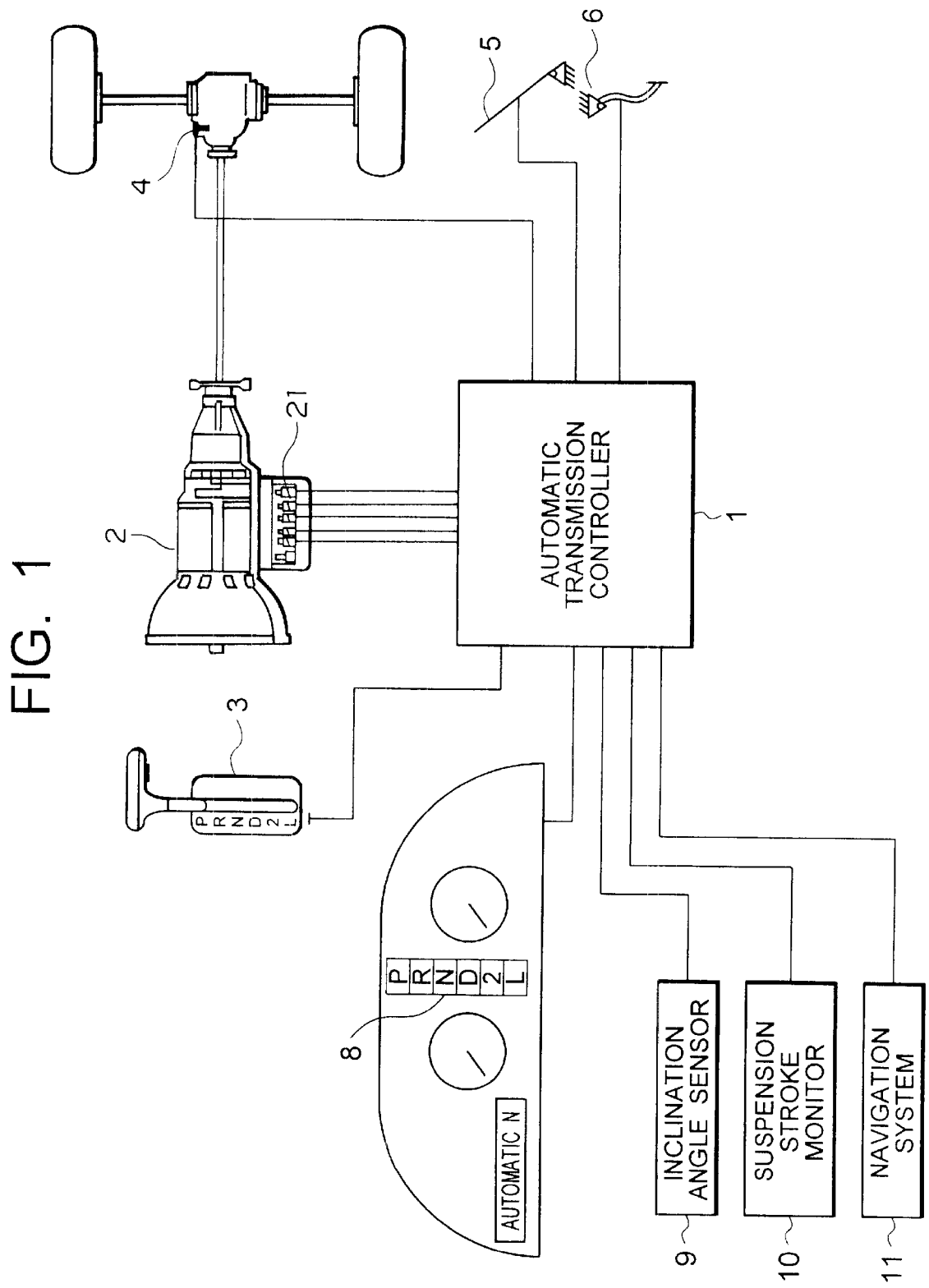
FIG. 1 is a block diagram of an automatic transmission controller having automatic-shifting-to-neutral control according to the present invention.

The present invention will be described according to each embodiment below. FIG. 1 is a drawing illustrating a structure of an automatic transmission controller having automatic-shifting-to-neutral control according to the present invention, and summarizing all the embodiments, which will be described below. In the drawing, in an automatic transmission controller having automatic-shifting-to-neutral control 1, a CPU performs transmission control according to a program based on input signals from a range select SW (switch) 3 operated by a driver and various sensors such as a vehicle speed sensor 4, an accelerator opening sensor 5, and a brake SW (switch) 6; and frictional engaging elements 21 within an automatic transmission 2 are used for actuating a clutch and a brake for range shifting.

An exclusive display lamp 7 arranged on a front panel of a vehicle, for example, indicates that the automatic transmission 2 is controlled to be automatic-shifting-to-neutral; a selected range display 8 is similarly arranged on the front panel, for example; an inclination angle sensor 9 and a suspension stroke monitor 10 are for sensing that the vehicle is on a slope; and a navigation system 11 displays road information.

Figure 2:
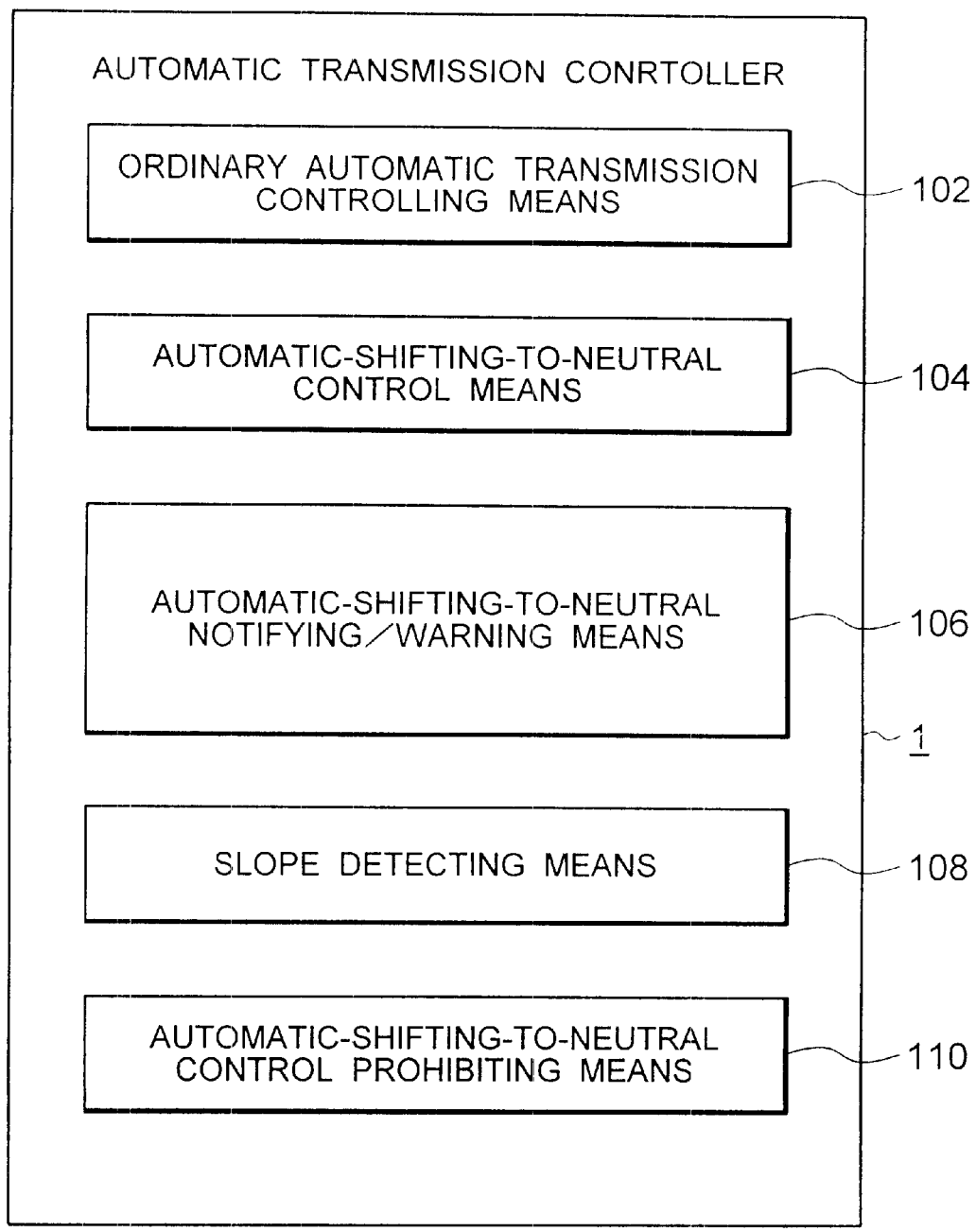
FIG. 2 is a functional block diagram of the automatic transmission controller shown in FIG. 1.
Figure 3:
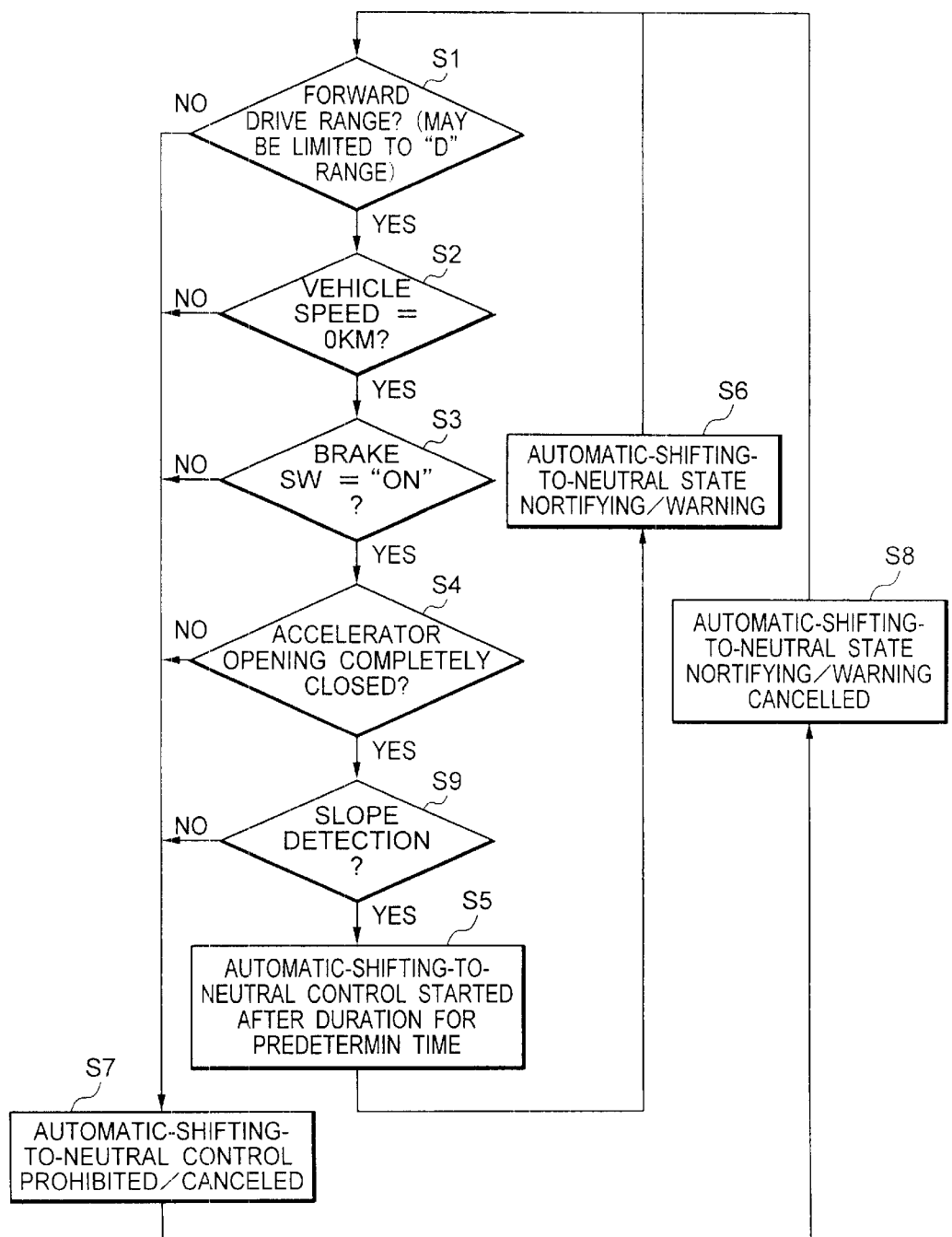
FIG. 3 is a flow chart for illustrating characteristic operations of the automatic transmission controller having automatic-shifting-to-neutral control according to the present invention.

FIG. 2 is a functional block diagram of the automatic transmission controller 1 shown in FIG. 1. A numeral 102 denotes ordinary automatic transmission controlling means, 104 denotes automatic-shifting-to-neutral means, 106 denotes automatic-shifting-to-neutral notifying/warning means, 108 denotes slope detecting means 108, and 110 denotes automatic-shifting-to-neutral control prohibiting means. FIG. 3 is a flow chart for illustrating operations of the automatic transmission controller 1, in particular the operations associated with automatic-shifting-to-neutral means 104, automatic-shifting-to-neutral-notifying/warning means 106, slope detecting means 108, and automatic-shifting-to-neutral control prohibiting means 110.

First Embodiment

A first embodiment according to the present invention will be described with reference to FIGS. 1 to 3. In addition, the inclination angle sensor 9, the suspension stroke monitor 10, and the navigation system 11 shown in FIG. 1 and Step S9 shown in FIG. 3 will be described according to a third embodiment. The automatic transmission controller 1 performs ordinary automatic transmission control of the automatic transmission 2 (ordinary automatic transmission controlling means 102) according to a program based on input signals from a range select SW3 operated by a driver and various sensors. The automatic transmission controller 1 is provided with an oil-hydraulic circuit within the automatic transmission 2 for actuating a clutch and a brake. The range shifting control of the automatic transmission 2 is carried out by applying electrical signals to solenoid valves, etc., associated with the frictional engaging elements 21 so as to control the pressure thereof in the oil-hydraulic circuit, and finally by changing combination of the clutch and the brake.

In the ordinary automatic transmission control, when the range select SW3 is selected at the forward drive range ("D", "2", or "L" range) at Step S1 shown in FIG. 3; the input from the vehicle speed sensor 4 is speed=0 km (the vehicle is stopping) at Step S2; the input from the brake SW is the "ON" state (the brake pedal being depressed) at Step S3; the input from the accelerator opening sensor 5 is completely closed (the gas pedal is not depressed) at Step S4, and further when these states continue for a predetermined time, the above-mentioned automatic-shifting-to-neutral control (automatic-shifting-to-neutral means 104) is initiated at Step S5 in order to reduce fuel consumption.

During the automatic-shifting-to-neutral control, the notifying/warning to a driver about the automatic-shifting-to-neutral state is performed at Step S6. The notifying/warning is carried out by lighting or flashing the display lamp 7 for indicating the automatic-shifting-to-neutral state and arranged on the front panel, etc., as shown in FIG. 1. When at least one of conditions at Steps S1 to S4 is not realized, the automatic-shifting-to-neutral control is canceled at Step S7 and the notice/warning for automatic shifting to neutral (automatic-shifting-to-neutral notifying/warning means 106) is also canceled at Step S8.

In the embodiment described above, the exclusive display lamp 7 is provided; however, the both lamps may be turned on or flashed, one for indicating the present state of the automatic transmission 2, that is, for the forward drive range ("D", "2", or "L") and the other lamp for the "N" range, in the selected range display 8 arranged on the front panel, etc., shown in FIG. 1, in many vehicles. Furthermore, the notifying/warning means for automatic-shifting-to-neutral may be any means as long as it can bring notifying/warning the automatic-shifting-to-neutral state to a driver and may be means using sound or vibration as well as visual means.

Second Embodiment

Figure 4:
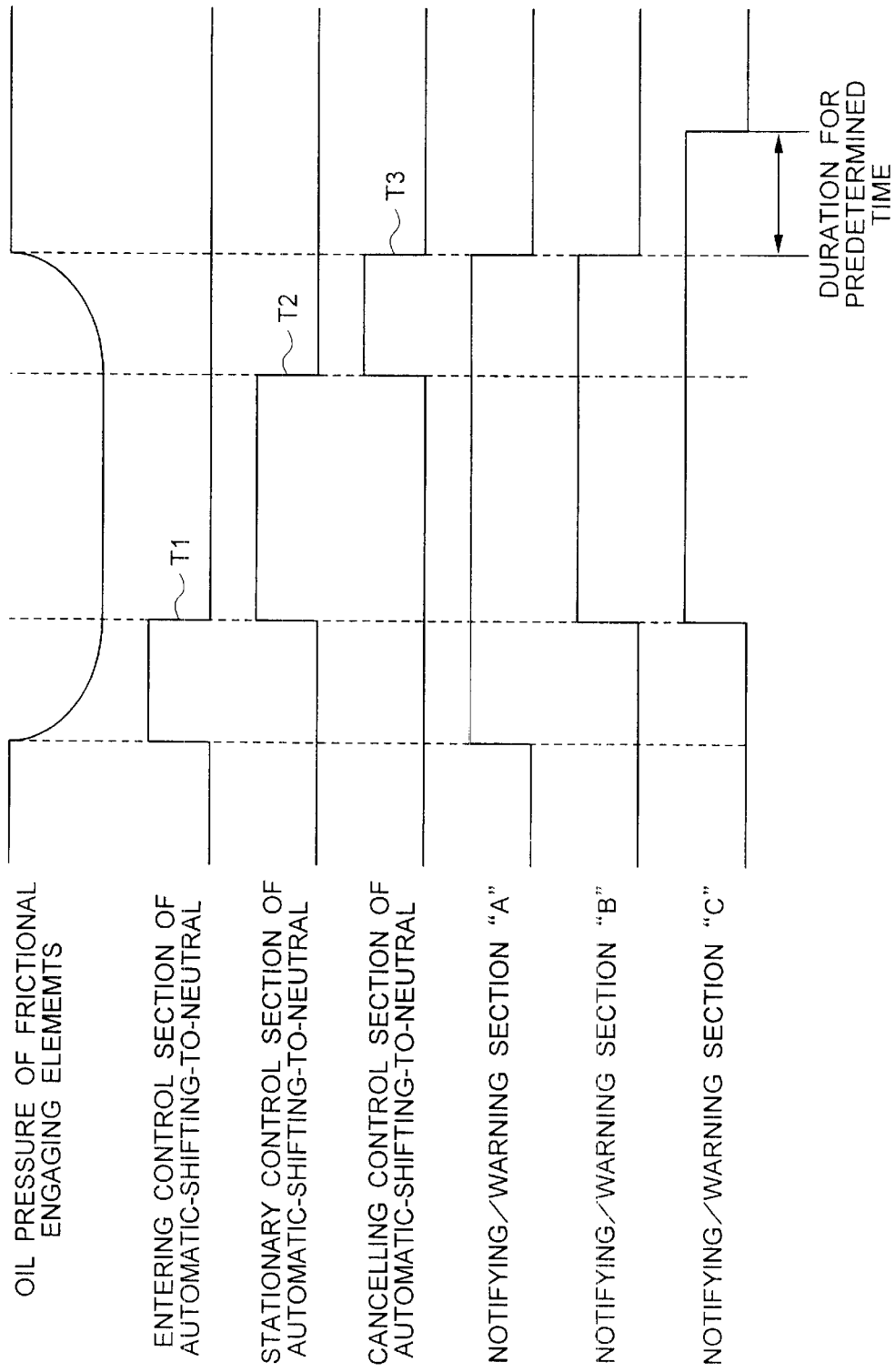
FIG. 4 is a schematic representation for illustrating a notifying/warning section of the automatic-shifting-to-neutral state according to a second embodiment of the present invention.

In this embodiment, the period for bringing notifying/warning about the automatic-shifting-to-neutral state to a driver is considered in the automatic-shifting-to-neutral notifying/warning means 106. As shown in FIG. 4, when the automatic transmission controller 1 performs the automatic-shifting-to-neutral control, it is defined that the period until that frictional engaging elements in the engaged state are released is an entering control section T1; the period during the released is a stationary control section T2; and the period until that frictional engaging elements in the released state are engaged for canceling the automatic-shifting-to-neutral control is a canceling control section T3.

When the period that the frictional engaging elements are completely not in the engaged state is precisely informed to a driver, the period to be notified/warned is to be the entering control section+the stationary control section+the canceling control section (see the notifying/warning section "A" in FIG. 4). When it is notified that the automatic transmission 2 is in the shifted state to neutral in fact, the period to be notified/warned is to be the stationary control section+the canceling control section (see the notifying/warning section "B" in FIG. 4). Furthermore, when the period of the automatic transmission 2 until the completely shifted to the forward drive range state is notified, the period to be notified/warned is extending for a predetermined time after completion of the canceling control section (see the notifying/warning section "C" in FIG. 4).

Third Embodiment

In this embodiment, moving backward of a vehicle on a slope is prevented by prohibiting the automatic-shifting-to-neutral control. That is, Step S9 shown in FIG. 3 is provided; it is determined whether the vehicle is on a slope or not (the slope detecting means 108); and when it is determined that the vehicle is on a slope, the moving backward of the vehicle on the slope due to the automatic-shifting-to-neutral control is prevented by prohibiting the automatic-shifting-to-neutral control at Step S7 (the automatic-shifting-to-neutral control prohibiting means 110).

As the slope detecting means 108, it is determined whether the vehicle is on a slope or not by a signal from the inclination angle sensor 9 equipped on the vehicle as shown in FIG. 1, for example.

Figure 5:
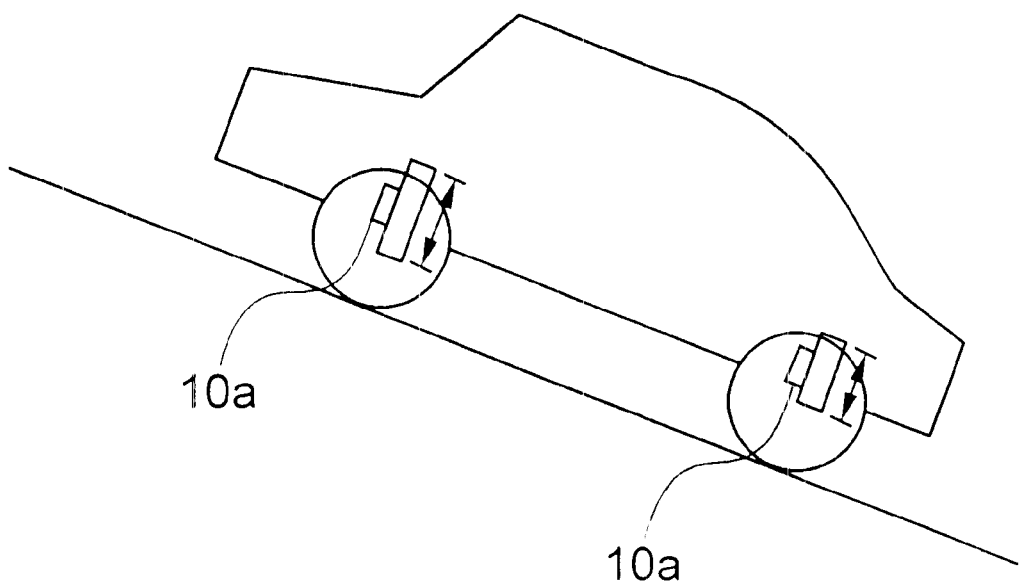
FIG. 5 is a schematic representation for illustrating a suspension stroke monitor according to the present invention.

As another manner, it may be determined by the suspension-shrinkage difference between front and rear wheels using signals from the suspension stroke monitor 10 (see FIG. 1) monitoring the suspension stroke (shrinkage) by sensors 10a arranged in suspensions of the front and rear wheels as shown in FIG. 5.

Furthermore, the slope may also be determined by the road gradient information, etc., in the information of the navigation system 11 equipped on a vehicle and displaying road information, etc., on a screen.

In addition, this embodiment comprising the slope detecting means 108 and the automatic-shifting-to-neutral control prohibiting means 110 may be independently performed or may be performed in combination with the above-mentioned embodiments As described above, according to the present invention, an automatic transmission controller having automatic-shifting-to-neutral control for shifting the automatic transmission to neutral when a vehicle is continuously stopped in the idling state for a predetermined time, the automatic transmission controller comprises automatic-shifting-to-neutral notifying/warning means for notifying an automatic-shifting-to-neutral state. With these features, a driver cannot feel a sense of incongruity because the automatic shifting controlled state to neutral of the automatic transmission controller can be recognized by the driver.

In the automatic-shifting-to-neutral notifying/warning means, an exclusive lamp may be turned on or flashed. With these features, a simple and inexpensive device can be utilized.

In the automatic-shifting-to-neutral notifying/warning means, the lamp for the N range of a range select display may be turned on or flashed along with the lamp for the present range. With these features, an existing device can be utilized.

The automatic-shifting-to-neutral notifying/warning means may notify/warn the shifting state to neutral covering through an entering control section of the automatic control for shifting to neutral, a stationary control section thereof, and a canceling control section thereof. Therefore, the period that the frictional engaging elements are not completely in the engaged state can be notified to a driver.

The automatic-shifting-to-neutral notifying/warning means may notify/warn the shifting-to-neutral state during a stationary control section of the automatic-shifting-to-neutral control and a canceling control section thereof. Therefore, the period that the automatic transmission is in fact in the automatic-shifting-to-neutral state can be notified. Also, when the automatic-shifting-to-neutral state is canceled in the entering control section by releasing a brake pedal by a driver, for example, the additional information will not have to bother the driver.

The automatic-shifting-to-neutral notifying/warning means may notify/warn the shifting state to neutral extending for a predetermined time after the completion of the canceling control section. Thereby, the period until the automatic transmission is completely shifted to the forward drive range can be notified, thereby improving the safety.

The automatic transmission controller may further comprise slope detecting means for detecting that a vehicle is on a slope and automatic-shifting-to-neutral control prohibiting means for prohibiting the automatic-shifting-to-neutral control when it is detected that the vehicle is on a slope. With these features, backward moving of vehicles on a slope can be prevented by prohibiting the automatic-shifting-to-neutral control.

An automatic transmission controller having automatic-shifting-to-neutral control for shifting the automatic transmission to neutral when a vehicle is continuously stopped in an idling state for a predetermined time, according to the present invention, the automatic transmission controller comprises slope detecting means for detecting that a vehicle is on a slope and automatic-shifting-to-neutral control prohibiting means for prohibiting the automatic-shifting-to-neutral control when it is detected that the vehicle is on a slope. With these features, backward moving of vehicles on a slope can be prevented by prohibiting the automatic-shifting-to neutral control.

The slope detecting means may comprise an inclination angle sensor for detecting a slope from the output of the sensor. Therefore, a simple device and also depending on the kind of vehicles, an existing device can be utilized.

The slope detecting means may comprise a suspension stroke sensor for detecting a slope from the output of the sensor. Therefore, a simple device and also depending on the kind of vehicles, an existing device can be utilized.

The slope detecting means may also comprise a navigation system for detecting a slope from the output of the system. Therefore, a simple device and also depending on the kind of vehicles, an existing device can be utilized.

What is claimed is:

1. An automatic transmission controller having automatic-shifting-to-neutral control for shifting the automatic transmission to neutral when a vehicle is continuously stopped in an idling state for a predetermined time, the automatic transmission controller, comprising;

notifying/warning means for notifying that the state has automatically shifted to neutral; and automatic-shifting-to-neutral control prohibiting means for prohibiting the automatic-shifting-to-neutral control.

2. The automatic transmission controller according to claim 1, wherein an exclusive lamp of the notifying/warning means is operated by either lighting or flashing.

3. The automatic transmission controller according to claim 2, wherein the notifying/warning means notifies/warns a shifting-to-neutral state during control sections which are an entering control section of automatic-shifting-to-neutral, a stationary control section thereof, and a canceling control section thereof.

4. The automatic transmission controller according to claim 2, wherein the notifying/warning means notifies/warns a shifting-to-neutral state during a stationary control section of automatic-shifting-to-neutral and a canceling control section thereof.

5. The automatic transmission controller according to claim 4, wherein the notifying/warning means notifies/warns the shifting state to neutral for a predetermined time after the completion of the canceling control section.

6. The automatic transmission controller according to claim 1, wherein in the notifying/warning means, a lamp for the N range of a range select display is operated by either lighting or flashing along with a lamp for the present range.

7. The automatic transmission controller according to claim 6, wherein the notifying/warning means notifies/warns a shifting-to-neutral state during control sections which are an entering control section of automatic-shifting-to-neutral, a stationary control section thereof, and a canceling control section thereof.

8. The automatic transmission controller according to claim 6, wherein the notifying/warning means notifies/warns a shifting-to-neutral state during a stationary control section of automatic-shifting-to-neutral and a canceling control section thereof.

9. The automatic transmission controller according to claim 8, wherein the notifying/warning means notifies/warns the shifting state to neutral for a predetermined time after the completion of the canceling control section.

10. The automatic transmission controller according to claim 1, wherein the notifying/warning means notifies/warns a shifting-to-neutral state during control sections which are an entering control section of automatic-shifting-to-neutral, a stationary control section thereof, and a canceling control section thereof.

11. The automatic transmission controller according to claim 1, wherein the notifying/warning means notifies/warns a shifting-to-neutral state during a stationary control section of automatic-shifting-to-neutral and a canceling control section thereof.

12. The automatic transmission controller according to claim 11, wherein the notifying/warning means notifies/warns the shifting state to neutral for a predetermined time after the completion of the canceling control section.

13. The automatic transmission controller according to claim 1, further comprising slope detecting means for detecting that the vehicle is on a slope, wherein the automatic-shifting-to-neutral control prohibiting means prohibits the automatic-shifting-to-neutral control when the slope detecting means detects that the vehicle is on a slope.

14. The automatic transmission controller according to claim 13, wherein the slope detecting means comprises an inclination angle sensor for detecting the slope from the output of the sensor.

15. The automatic transmission controller according to claim 13, wherein the slope detecting means comprises a suspension stroke sensor for detecting the slope from the output of the sensor.

16. The automatic transmission controller according to claim 13, wherein the slope detecting means comprises a navigation system for detecting the slope from the output of the system.

* * * * *